United States Patent [19]
Oswald

[11] 3,932,791
[45] Jan. 13, 1976

[54] MULTI-RANGE, HIGH-SPEED A.C. OVER-CURRENT PROTECTION MEANS INCLUDING A STATIC SWITCH

[76] Inventor: Joseph V. Oswald, 2852 S. Central Park Ave., Chicago, Ill. 60623

[22] Filed: Feb. 7, 1974

[21] Appl. No.: 440,585

Related U.S. Application Data

[63] Continuation-in-part of Ser. No. 325,812, Jan. 22, 1973, abandoned.

[52] U.S. Cl.... 317/33 SC; 317/18 R; 317/156 TR; 323/44 R; 323/24; 323/6
[51] Int. Cl.² ........................................... H02H 3/08
[58] Field of Search....... 317/33 SC, 31, 22, 33 VR, 317/156 TR, 157; 323/43.5, 44, 45, 50, 51, 85, 53; 321/14, 11

[56] References Cited
UNITED STATES PATENTS

| | | | |
|---|---|---|---|
| 2,046,748 | 7/1936 | Hudson | 317/156 TR |
| 2,566,260 | 8/1951 | Thomson | 323/50 |
| 2,686,290 | 8/1954 | Macklem | 323/85 X |
| 3,461,378 | 8/1969 | King | 323/43.5 |
| 3,501,677 | 3/1970 | Hurtle | 317/33 SC |
| 3,683,237 | 8/1972 | Walstad et al. | 317/33 SC X |

*Primary Examiner*—J. D. Miller
*Assistant Examiner*—Patrick R. Salce
*Attorney, Agent, or Firm*—Wegner, Stellman, McCord, Wiles & Wood

[57] ABSTRACT

An electronic circuit breaker for use in A.C. power circuits is provided with means for varying the overload current response level at which the circuit breaker removes power from the load. The load current is conducted through a primary winding of a transformer, and a circuit breaker switch is responsive to voltage across the secondary winding of the transformer exceeding a predetermined magnitude corresponding to the selected overload current level to remove power from the load. A lockout circuit prevents reapplication of power other than by a manual reset switch. The overload current response level corresponding to the predetermined magnitude of the voltage across the secondary winding is variably selected by varying the inductive coupling between the primary winding and the secondary winding. The primary winding is wound about one leg of a magnetic core and the secondary winding is wound about another leg of the magnetic core. In one embodiment, the inductive coupling is varied by altering a reluctance gap between the first and second legs of the core. In another embodiment, the inductive coupling is varied by changing the effective reluctance of a third leg of the core in parallel magnetic circuit with the first and second legs of the core. Both means for varying the gap and means for varying the effective reluctance of a third leg of the core may be combined to provide different ranges of selectibility. The overload current response level may also be adjusted by varying a reluctance gap in the first leg of the transformer core.

8 Claims, 5 Drawing Figures

3,932,791

MULTI-RANGE, HIGH-SPEED A.C. OVER-CURRENT PROTECTION MEANS INCLUDING A STATIC SWITCH

CROSS REFERENCE

This application is a continuation-in-part of my application Ser. No. 325,812 filed Jan. 22, 1973, and now abandoned.

BACKGROUND OF THE INVENTION

This invention relates to electronic A.C. overload current-responsive electronic circuit breakers and, more particularly, to such a circuit breaker with means for selecting the overload current response level at which the circuit breaker disconnects power from a load.

In many applications where A.C. power is provided to a load, it is necessary to protect the load from overload current in excess of the current-carrying capabilities of the load. Numerous electro-mechanical circuit breakers are known which provide this protection by monitoring the load current and disconnecting power from the load in response to load current exceeding a predetermined overload level. However, due to inherent short-comings such as mechanical lag, potential for mechanical failure and general lack of accuracy, such devices are not always satisfactory, especially where over-current sensitive circuit components may be involved.

While in most applications the current-carrying capability of the load remains fixed, as thus does the overload level to which the circuit breaker is responsive, in some other applications the current-carrying capabilities of the load varies. For instance, the load may comprise a rectifier type power supply which, in turn, may serve a widely varying load that may pose surge and/or short-circuit load hazards to the rectifier elements or other over-current sensitive circuit components of the power supply which may not be absorbed much beyond a one-cycle time interval. Numerous other situations call for a highly sensitive circuit breaker which can be adjusted to respond to different overload current levels.

Known solutions of this problem have included the use of multiple fuses, each responsive to a different current level to remove power from the load. The use of multiple circuit breakers is generally prohibited by cost and space limitations. Known electronic circuit breakers, however, are generally designed to be responsive to only one particular overload current level.

SUMMARY OF THE INVENTION

The principal object of the present invention is to provide an electronic circuit breaker which may be readily adjusted to be responsive to different overload current levels to remove A.C. power from a load.

Briefly, this object is achieved in accordance with the invention by providing an electronic switch that monitors the voltage across a secondary winding of a transformer, the primary of which carries the load current, and means associated with a magnetic core of the transformer for varying the ratio of the magnitude of the voltage induced in the secondary winding to the load current conducted through the primary winding.

According to the preferred embodiment, the magnetic core has two or three legs, with the primary winding being wound about a first of the legs and the secondary winding being wound about a second one of the legs. In one embodiment, means are provided for varying a reluctance gap between the first and second legs of the magnetic core. In another embodiment directed to monitoring load current in the multi-hundred ampere levels, the output of the secondary winding is varied by varying a reluctance gap in the first leg of the core about which the primary winding is wound. In a further embodiment, when the magnetic core is provided with three legs, an auxiliary winding about the third leg closed about itself through a variable resistor generates counter ampere turns to alter the division of magnetic flux generated by the primary winding between the third leg of the core and second leg of the core about which the secondary winding is wound. All three means for varying the relationship between the secondary winding output and the primary winding load current can be used together.

Thus, an important feature of the present invention is the provision of an electronic circuit breaker in which the overload current level at which the circuit breaker removes power from the load can be selectively varied by transformer means used to monitor the load current.

The electronic circuit breaker includes a semiconductor switch connected in series with the primary winding and the load, a trigger circuit for rendering the semiconductor switch conductive, and a switch control circuit for turning off the switch upon detection of an overload condition. The switch control circuit is connected across the secondary winding and is responsive to a voltage developed thereacross exceeding a predetermined magnitude corresponding to the selected overload current level to disable the trigger circuit and thereby render the switch nonconductive to remove power from the load. Means are provided such that when the circuit breaker is actuated to remove power from the load, power cannot be reapplied until the circuit breaker is reset by means of a manually operable switch. Although actuation of the reset switch causes the circuit breaker to reapply power to the load, the circuit breaker is "trip-free," i.e., the switch control circuitry is insusceptible to external interference with recycling the circuit breaker back into the off state under persistent over-current conditions.

In a preferred embodiment, two unidirectional conductive switches connected in inverse, parallel relationship are used to apply current to the load during opposite half wave cycles of A.C. A separate trigger disable circuit associated with each switch is connected with its own secondary winding, and the switches are turned off sequentially in successive half waves of the A.C. A lockout circuit is provided to prevent the reduction in load current through the primary winding when power is removed from reducing the voltage output of the secondary windings below the predetermined level necessary to keep the trigger circuits disabled.

BRIEF DESCRIPTION OF THE DRAWINGS

The foregoing features and advantages will be made more apparent and further features and advantages will be illustrated in the following detailed description of a preferred embodiment of the electronic circuit breaker of the present invention taken together with the following drawings, in which.

DESCRIPTION OF THE PREFERRED EMBDODIMENT

Figure 1:
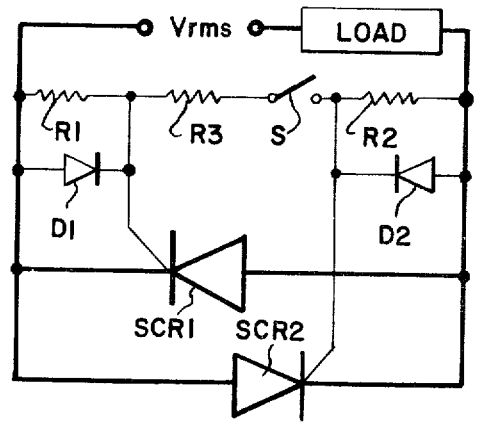
FIG. 1 is a circuit schematic of an electronic circuit breaker of the prior art.

Shown in FIG. 1 is a known electronic switch of the general type which could be used in an electronic circuit breaker. This circuit is shown and described in the fifth edition of the General Electric SCR manual at Chapter 8, FIG. 8.1b, pages 195–197. Briefly, silicon controlled rectifiers, SCR1 and SCR2, connected in inverse parallel relationship with one another and in series with the load across an A.C. voltage supply, conduct current to the load when provided with trigger signals generated by circuitry associated with their respective gates. When switch S is closed, part of the current through the load is conducted through resistors R1, R2 and R3 in series with the switch. A resultant voltage developed between resistors R1 and R3 is connected to the gate of SCR1 which causes it to conduct during the half waves of the A.C. power supply that it is forward biased. Likewise, the voltage developed between resistors R2 and R3 is applied to the gate of SCR2 which causes it to conduct during the opposite half waves of the A.C power supply. Diodes D1 and D2 connected across the gate-anode junction of SCR1 and SCR2, respectively, prevent reverse voltage from being applied to the gate-anode junctions during the half waves that the respective SCR's are nonconductive. Resistor R3 is selected to prevent the maximum permissible forward gate voltage and current of SCR1 and SCR2 from being exceeded.

When switch S is opened, gate signals to both SCR1 and SCR2 are terminated, and when the current through the conducting one of the SCR's is reduced to zero at the end of the half cycle, it assumes a nonconductive state. The SCR's will not again turn on until trigger signals are again applied to their respective gates. If switch S opens in response to a predetermined overload current level being exceeded, the circuit of FIG. 1 functions as an overload circuit breaker.

Figure 2:
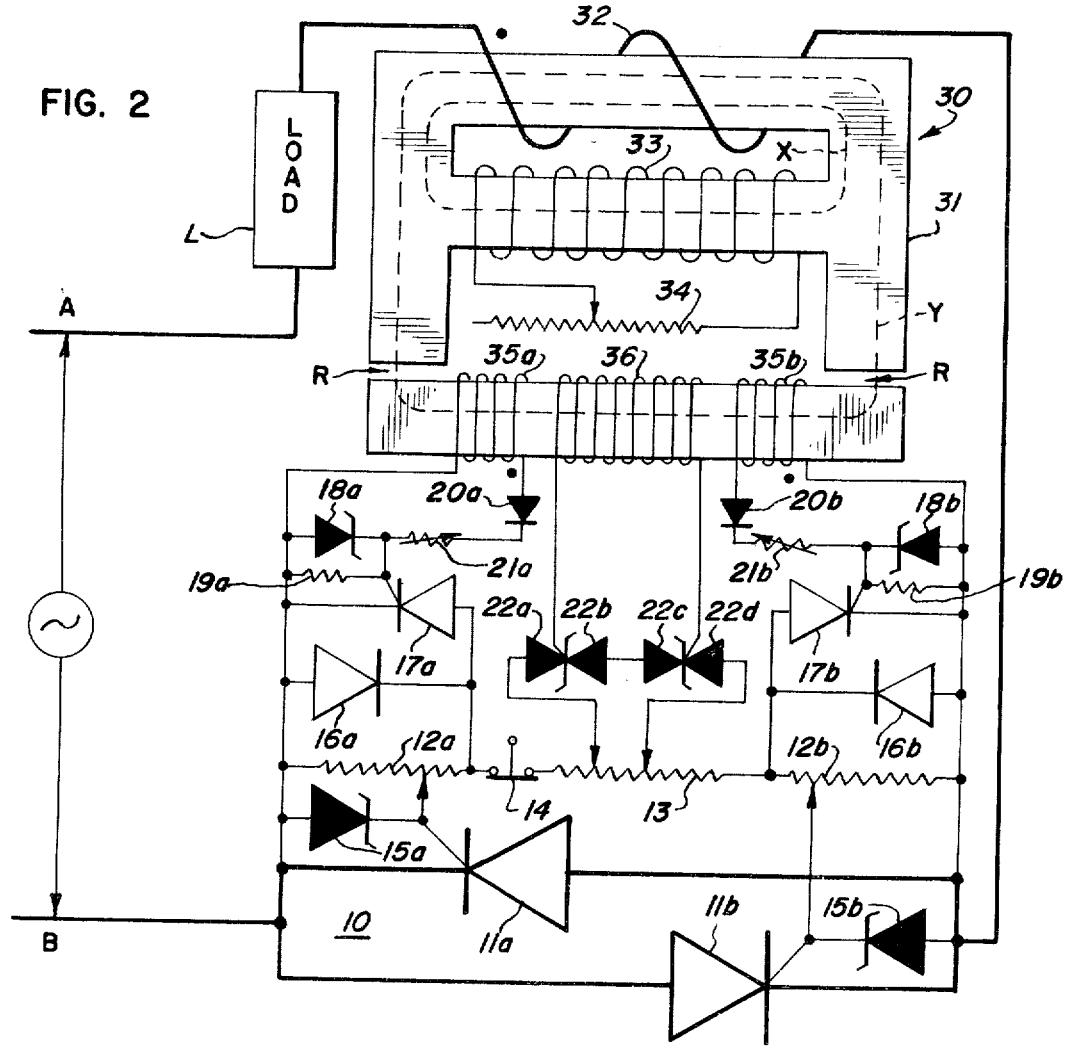
FIG. 2 is a circuit schematic of a preferred embodiment of the present invention in which the overload current level may be varied by means of an auxiliary coil wound about a third leg of the transformer core.

Referring to FIG. 2, the basic circuit of FIG. 1 as modified in accordance with the present invention is shown. As in the circuit of FIG. 1, a semiconductor switch, generally designated by reference numeral 10, includes a pair of silicon-controlled rectifiers, SCR's 11a and 11b, connected in parallel with one another but poled in opposite directions and connected in series with a load L to be protected, across an A.C. power supply. Also, like the circuit of FIG. 1, a voltage divider comprised of series resistors 12a, 13 and 12b, is connected in parallel with the SCR's 11a and 11b to provide trigger signals to the respective gates thereof. Gate current for SCR 11a is taken off a wiper contact 41a of resistor 12a, and gate current for SCR 11b is taken off a wiper contact 41b of resistor 12b. Diodes 16a and 16b, respectively connected across resistors 12a and 12b, serve the same function as diodes D1 and D2 in the circuit of FIG. 1 of preventing reverse polarity voltages from being applied to the gate-anode junctions of the SCR's 11a and 11b respectively associated therewith. Zener diodes 15a and 15b connected across the gate-anode junctions of SCR's 11a and 11b, respectively, protect these junctions from excessive forward voltages due to transient surges or the like.

A manually operable on-off switch 14 in series with resistors 12a, 13 and 12b is provided to reset the circuit breaker to permit it to reapply current to the load after it has removed power from the load in response to an overload current. Like switch S of the circuit of FIG. 1, switch 14, if opened, will turn off SCR's 11a and 11b. It is therefore available as a manual means to conveniently operate the circuit breaker under normal or non-overload circumstances. Other circuitry removes trigger signals from the gates of the SCR's automatically in response to an overload current as will appear hereinafter.

As seen in FIG. 2, the load L and semiconductor switch 10 are connected in series with a primary winding 32 of a transformer generally designated by reference numeral 30. Transformer 30 has a magnetic core 31 with one leg about which primary winding 32 is wound and another leg in magnetic circuit therewith about which secondary winding means 35a and 35b are wound. In accordance with the present invention, various means are provided for altering the relationship between load current through primary winding 32 and the resultant voltage induced in secondary windings 35a and 35b which overload varying means will be described hereinafter. Regardless of the ratio between load current magnitude and secondary winding voltage magnitude, the voltage induced in the secondary winding is directly proportional to the load current conducted through primary winding 32 in.

As mentioned earlier, switch control circuitry, other than reset switch 14, is provided to terminate conduction of SCR's 11a and 11b in response to detection of an overload current. The switch control circuitry includes two trigger disable circuits, one responsive to the voltage across secondary winding 35a exceeding a predetermined magnitude corresponding to the overload current level to remove trigger signals applied to SCR 11a and the other responsive to the voltage induced across secondary winding 35b to remove trigger signals from SCR 11b.

The trigger signal disable circuit associated with SCR 11a includes an SCR 17a connected across resistor 12a and adapted to receive gate current from secondary winding 35a. If the voltage across secondary winding 35a exceeds a predetermined magnitude, SCR 17a will receive sufficient gate drive to turn on at the beginning of the half wave of A.C. during which SCR 11a normally conducts. At the overload current level, the secondary winding voltage does exceed the predetermined magnitude and SCR 17a does turn on, and shunts gate current away from the gate of SCR 11a. With the resistor 12a disabled from applying trigger signals to SCR 11a, SCR 11a will not conduct load current and power is thereby removed from the load.

One side of secondary winding 35a is directly connected to the cathode of SCR 17a. The other side of secondary winding 35a is connected to the gate of SCR 17a through a series circuit including a diode 20a and, a variable resistor 21a. A Zener diode 18a connected in parallel between the gate and cathode of SCR 17a with resistor 19a protects the gate cathode junction from excessive forward voltages. Diode 20a is provided to prevent reverse voltage from being applied to the gate junction.

The trigger disable circuit associated with SCR 11b functions in an identical fashion as the trigger disable circuit associated with SCR 11a and corresponding elements of the two circuits bear the same numerical prefixes. The difference of course is that the trigger disable circuit for SCR 11b is responsive to voltage induced in secondary winding 35b, whereas the trigger disable circuit for SCR 11a is responsive to the voltage induced in secondary winding 35a. Diode 20b prevents gate current from being applied to SCR 17b other than during the half-cycle of A.C. that SCR 11b is forward-biased and SCR 11a is reverse-biased.

Thus, SCR's 17a and 17b may not be triggered into conduction simultaneously, but rather can only be turned on in successive half cycles of the A.C. Likewise, load current-carrying SCR's 11a and 11b do not conduct simultaneously but alternately conduct during successive half cycles of the A.C., and are disabled from conducting in like sequence. Variable resistors 21a and 21b may be adjusted to insure that SCR's 17a and 17b will be turned on at the same level. This eliminates the necessity of matching the characteristics of SCR's 17a and 17b.

To prevent the reapplication of power in response to reduction of load current below the overload level, a latching circuit, including auxiliary winding 36, is provided. Auxiliary winding 36 is wound about the second leg of the magnetic core, and is connected to resistor 13 by means of resistor taps 40a, and 40b through Zener diodes 22a and 22b, respectively. The auxiliary winding 36 is wound about the same leg of the magnetic core as secondary windings 35a and 35b and becomes progressively energized from current through resistor 13 as first one and then the other of SCR's 11a and 11b of semiconductor switch 10 turns off to offset the canceled ampere turns of primary winding 32. Therefore, auxiliary winding 36 maintains the voltage output across secondary windings 35a and 35b above the predetermined level necessary to gate on SCR's 17a and 17b during alternate half cycles. Thus, once semiconductor switch 10 has been turned off in response to an overload current, it will remain off until reset by means of manually operable switch 14, even though the load current may be reduced below the overload level.

The circuit breaker is reset when switch 14 is opened at least momentarily. When switch 14 is opened, the current through the auxiliary winding 36 is temporarily terminated and the trigger signals induced in secondary windings 35a and 35b therefrom interrupted. When switch 14 is again closed, SCR's 11a and 11b will be successively turned on to reapply power to the load. If an overload condition still exists, it will be detected within one cycle of the A.C. current by the trigger disable circuitry to again turn off the load current-carrying semiconductor switch 10. If the overload condition is no longer present, the semiconductor switch 10 will continue to apply power to the load. An important feature of the switch control circuitry is that the circuit breaker is "trip-free", i.e., as stated hereinbefore, the disabling function of the switch control circuitry is insusceptible to external interference. If the switch is open, normal power is removed and if the switch is closed, abnormal power will be automatically removed within one cycle of overlaod current.

To prevent parasitic current from being developed in winding 36 when power is being applied to the load which might interfere with a uniform response of the circuit breaker, the auxiliary winding 36 is connected to resistor 13 through Zener diodes 22a and 22b. Zener diodes 22a and 22b prevent the relatively low voltage induced in winding 36 during the power-applying state of semiconductor switch 10 from being applied across resistor 13. In effect, when semiconductor switch 10 is conducting, auxiliary winding 36 is open-circuited. However, as indicated above, once switch 10 is turned off, the full A.C. voltage is coupled across resistor 13. This raises the voltage across Zener diodes 22a and 22b above their breakover voltage to permit the conduction of latching current through the auxiliary winding.

Zener diodes 23a and 23b connected in series across auxiliary winding 36 in opposite polarity with one another function as a voltage regulator to limit the total voltage applied across auxiliary winding 36 to prevent the application of excessive forward gate voltages to SCR's 17a and 17b.

Figure 3:
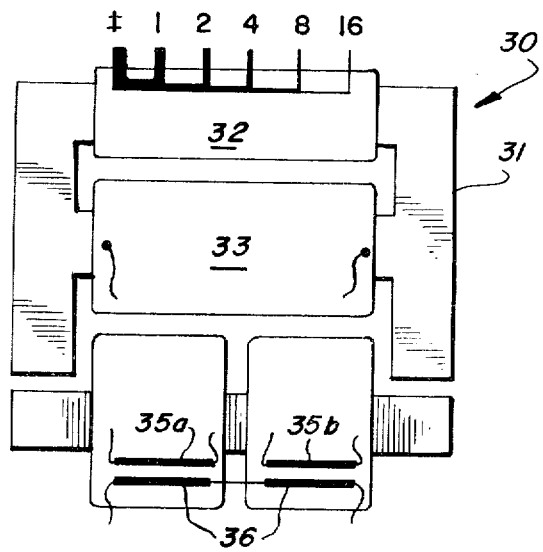
FIG. 3 is a schematic illustration of a preferred mode of construction of the transformer used in the electronic circuit breaker of the present invention.

As indicated above, the control circuit for semiconductor switch 10 is responsive to the voltage developed across secondary windings 35a and 35b exceeding a predetermined value to terminate conduction. The voltage developed across secondary windings 35a and 35b is directly proportional to the load current, and the predetermined magnitude of secondary winding voltage at which power of the load is terminated corresponds to the selected overload current level. In accordance with the present invention, means are provided for varying the overload current response level by varying the relationship between the magnitude of the load current and the voltage developed across the secondary windings. This may be done by varying the ampere turns of primary winding 32 by changing the number of turns in the primary winding. Thus, as seen in FIG. 3, primary winding 32, shown in block form, may have multiple taps through which different numbers of turns may be selected. The overload current level may also be selectively varied by varying the inductive coupling between the primary winding and the secondary windings.

Figure 4:
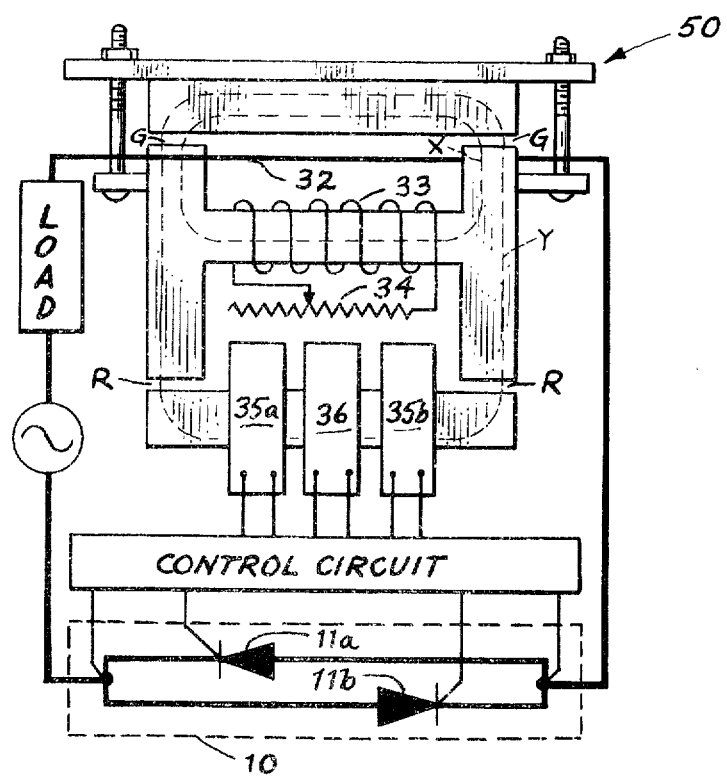
FIG. 4 is a schematic diagram of another embodiment of the electronic circuit breaker with the control circuit and switch shown in block form in which overload current level may be adjusted by varying a high reluctance gap in the first leg of the transformer core.
Figure 5:
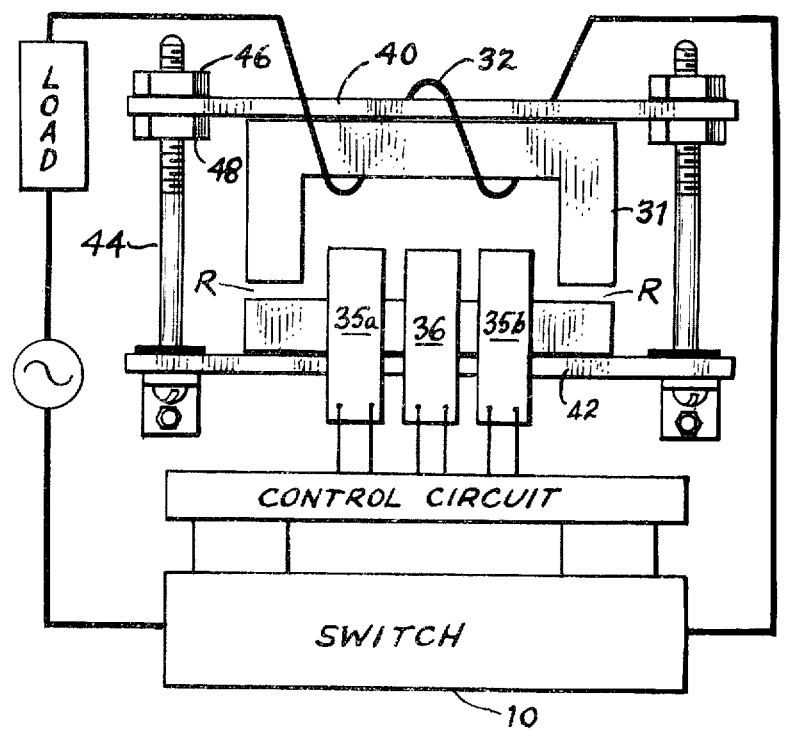
FIG. 5 is a schematic diagram illustrating a preferred means for adjusting a reluctance gap between the first and second legs of the magnetic core to adjust the degree of inductivity between the primary and secondary windings.

Various means are shown for varying the inductive coupling between the primary winding and the secondary windings in the embodiments of the present invention in FIGS. 2, 4 and 5. The semiconductor switch 10 and control circuit therefor of FIG. 2 is used in the circuit breakers of FIGS. 4 and 5, but for purposes of brevity are shown only in block form in these latter two embodiments.

One means of altering the inductive coupling between the primary winding and the secondary windings comprises one or two high reluctance gaps R between the second leg of the magnetic core about which the secondary windings are wound and the remaining portion of the magnetic core including the leg about which the primary winding is wound, and means for setting and securing the gap or gaps R. The magnitude of the magnetic flux generated by the load current conducted through primary winding 32 is dependent upon the number of ampere turns of the primary winding and the reluctance of the magnetic circuit including the magnetic core. The total reluctance of the magnetic circuit is determined to a minor degree by the reluctance of the magnetic core, including that of both the first leg and second leg thereof, by chiefly by the dimensions of the reluctance gaps R.

The voltage induced in secondary windings 35a and 35b is directly proportional to the magnetic flux through the second leg of the magnetic core about which they are wound. Thus, by adjusting the dimensions of the reluctance gaps R, the magnitude of the magnetic flux through the secondary windings for a given load current can be pre-set. If the reluctance gaps are increased, the voltage induced in the secondary winding for a given load current decreases, and accordingly the overload level increases. Conversely, if the dimension of the reluctance gap is decreased, the overload current level is decreased.

A convenient means for varying the reluctance gap is shown in FIG. 5, in which particular embodiment it is provided that selection of the overload current response level may be achieved solely through the selective adjustment of the reluctance gap R. There the portion of the magnetic core 31 having the first leg thereof about which the primary winding 32 is wound is secured to a support member 40, and the portion of the magnetic core 31 comprising the second leg thereof about which the secondary windings are wound is secured to another support member 42. Support members 42 and 40 are adjustably secured together at their ends by means of screws 44 and nuts 46 and 48. The separation between support members 40 and 42, and thus the dimension of reluctance gaps R, may be adjusted by turning screws 44 in either a clockwise or counterclockwise direction. While this means for varying the reluctance gap is shown only in the embodiment of FIG. 5, it should be understood that the same means may be used to pre-set and secure the reluctance gaps R of the embodiments of FIGS. 2 and 4.

Another means for altering the inductive coupling between primary winding 32 and secondary windings 35a and 35b is shown in FIG. 4. There, reluctance gaps G are provided in the first leg of the magnetic core and the gaps G may be pre-set and secured by suitable adjustment means, generally designated by reference numeral 50. If the gaps G are decreased in dimension, the total reluctance of the magnetic circuit is decreased to lower the overload current response level. When the gaps G are increased, the total reluctance of the magnetic circuit is increased to raise the overload current response level. The dimension of the reluctance gaps G may be selected to accommodate and monitor load currents ranging into the multi-hundred ampere levels. At such high current levels, the dimension of gaps G are selected to prevent saturation of the core and to lower the flux through secondary windings 35a and 35b to a level coming within the scope of control achievable by adjusting the series resistance of the control winding 33, as will be explained in more detail hereinafter.

A third means referred to hereinabove for varying the inductive coupling between the primary winding and the secondary windings is shown in the embodiments of FIGS. 2 and 4. There, the magnetic core, in addition to having first and second legs, is provided with a third leg 54 about which an auxiliary winding 33 is wound and closed upon itself through a variable resistor 34. The total magnetic flux developed by primary winding 32 when conducting load current is divided between magnetic circuit path X through the third leg 54 and magnetic circuit path Y through the second leg of the core about which the secondary windings are wound. The magnetic flux developed by the primary winding is divided between the second leg, or Y path, and the third leg, or X path, in indirect proportion to the relative reluctances of the two paths.

Control winding 33 and variable resistor 34 provide means for varying the effective reluctance of the X path, thereby varying the proportion of the total flux through the Y path. If the variable resistor 34 in series with winding 33 is increased, the magnitude of the counter ampere turns generated by control winding 33 will decrease to lower the effective reluctance of the third leg 54 of the magnetic core. This will cause a lesser proportion of the total magnetic flux to pass through the second leg of the core and the secondary windings to raise the overload current response level. Conversely, if the resistance 34 is decreased, the resulting induced current circulating in the closed circuit of control winding 33 and resistor 34 generates an increased number of counter ampere turns to raise the effective reluctance of the third leg 54. When the effective reluctance of the third leg is increased, the proportion of the total magnetic flux through the second leg and the secondary windings is increased to lower the overload current level at which power is removed.

I claim:

1. In an electronic circuit breaker having semiconductor switch means connectible between a source of power and a load for removing power from the load when current therethrough exceeds a selected overload level, a circuit for selectively varying said overload response level, comprising:

a transformer having a primary winding connected in series with said semiconductor switch and a secondary winding inductively coupled with said primary winding, a voltage being developed across said secondary winding directly proportional to the current through said primary winding and semiconductor switch, the proportional factor depending upon the inductive coupling between the primary and secondary winding;

a switch control circuit responsive to the voltage developed across said secondary winding exceeding a predetermined magnitude to cause said semiconductor switch to assume a nonconductive state, thereby removing power from the load; and means associated with said transformer manually operable to selectively vary the inductive coupling between the primary winding and the secondary winding whereby the overload level corresponding to said predetermined voltage magnitude across the secondary winding may be selectively varied, said inductive coupling varying means including a magnetic core for said transformer having a first leg around which the primary winding is wound, a second leg around which the secondary winding is wound in parallel magnetic circuit with said first leg, and a third leg in parallel magnetic circuit with said first and second legs, a control winding wound around said third leg and closed upon itself through a variable resistor for varying the effective reluctance of said third leg, and means for varying the reluctance of one of said first and second legs including a reluctance gap in one of said first and second legs and means for selectively varying said gap.

2. The overload level varying circuit of claim 1 wherein said reluctance gap is between the second leg and the other two legs of the magnetic core.

3. The overload level varying circuit of claim 2, wherein the magnetic flux developed in the first leg by the load current through the primary winding is divided between the second leg and third leg in indirect proportion to the relative reluctances thereof.

4. The overload level varying circuit of claim 2, in which said inductive coupling varying means includes a reluctance gap between the first leg and the other two legs of the magnetic core.

5. The overload level varying circuit of claim 1 in which said reluctance gap is between said first leg and the other two legs of the magnetic core.

6. In an electronic circuit breaker having a semiconductor switch means connectible between a source of power and a load for removing power from the load when the current therethrough exceeds a selected overload level, a circuit for selectively varying said overload level, comprising:

a transformer having a primary winding connected in series with said semiconductor switch and a secondary winding inductively coupled with said primary winding, a voltage being developed across said secondary winding directly proportional to the current through said primary winding and semiconductor switch;

means for controlling said switch including means for applying trigger signals to the semiconductor switch to render it conductive, trigger disabling means connected with said secondary winding means for disabling said trigger signal applying means when the voltage developed across the secondary winding is greater than a predetermined magnitude corresponding to the selected overload level to disconnect power from the load, lockout means responsive to said semiconductor switch assuming a nonconductive state to maintain the voltage across said secondary winding above said predetermined magnitude, said trigger signal applying means thereby being kept disabled; and means associated with said transformer operable to vary the inductive coupling between the primary winding and the secondary winding whereby the overload level at which power is removed may be selectively varied.

7. The overload level varying circuit of claim 6, wherein said trigger applying means includes an impedance connected in parallel with said switch and said lockout means includes an auxiliary winding inductively coupled with said secondary winding and connected with said impedance, current from said impedance being conducted through said auxiliary winding inducing a voltage in said secondary winding in excess of said predetermined magnitude when said semiconductor switch is rendered nonconductive.

8. The electronic circuit breaker of claim 6 including a resistive circuit connected across said semiconductor switch means for providing power to both said trigger signal applying means and said lockout means, and a manually operable reset switch connected with said resistive circuit, and having one position which terminates the application of power to said lockout means to permit the reapplication of power to the load, said reset switch having one position in which said power is not provided and both said trigger applying means and said lockout means are disabled, and another position in which said power is provided.

* * * * *

UNITED STATES PATENT OFFICE
CERTIFICATE OF CORRECTION

PATENT NO. : 3,932,791
DATED : January 13, 1976
INVENTOR(S) : JOSEPH V. OSWALD

It is certified that error appears in the above—identified patent and that said Letters Patent are hereby corrected as shown below: Substitute drawing below for Figure 2:

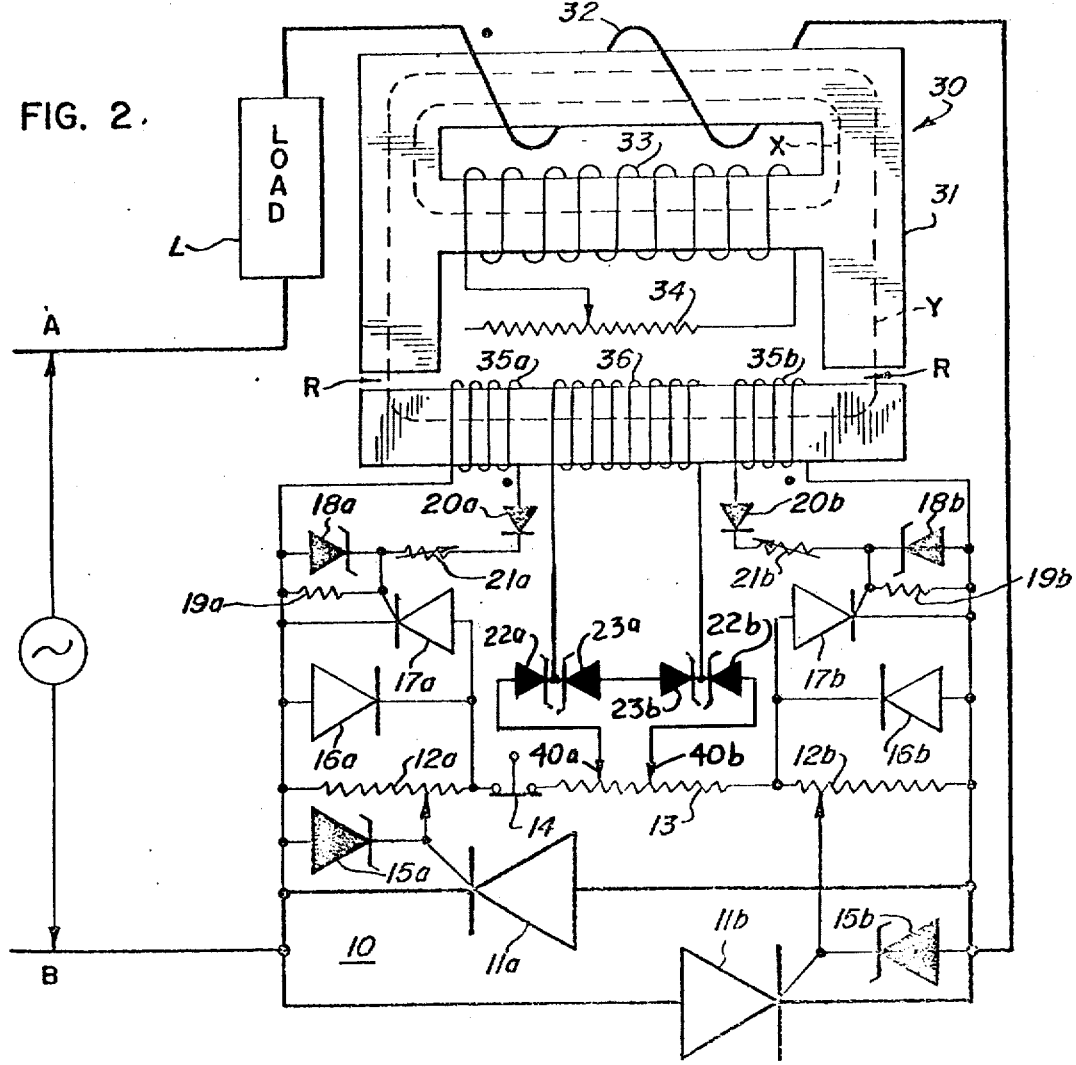

Signed and Sealed this

Twenty-third Day of November 1976

[SEAL]

Attest:

RUTH C. MASON
Attesting Officer

C. MARSHALL DANN
Commissioner of Patents and Trademarks